United States Patent [19]

Parker et al.

[11] Patent Number: 4,872,955
[45] Date of Patent: * Oct. 10, 1989

[54] VAPOR/LIQUID CONTACT COLUMN STRUCTURE

[75] Inventors: Trent J. Parker; Byron M. Parker, both of Salt Lake City, Utah

[73] Assignee: Uni-Frac Inc., Salt Lake City, Utah

[*] Notice: The portion of the term of this patent subsequent to Jun. 14, 2005 has been disclaimed.

[21] Appl. No.: 182,887

[22] Filed: Apr. 18, 1988

Related U.S. Application Data

[63] Continuation-in-part of Ser. No. 840,134, Mar. 17, 1986, Pat. No. 4,750,975.

[51] Int. Cl.[4] .......................... B01D 3/16; B01D 47/00
[52] U.S. Cl. ..................... 202/154; 202/158; 202/237; 202/264; 261/114.1; 261/114.2; 261/114.3; 261/148
[58] Field of Search ............... 202/158, 154, 237, 264, 202/162, 161; 261/114.1, 114.2, 114.3, 148; 203/20

[56] References Cited

U.S. PATENT DOCUMENTS

| | | | |
|---|---|---|---|
| 2,306,367 | 12/1942 | Benson et al. | 261/113 |
| 2,457,686 | 12/1948 | Kopita | 261/113 |
| 2,713,478 | 7/1955 | Ragatz | 261/114.1 |
| 2,737,377 | 3/1956 | Huggins et al. | 261/114.1 |
| 2,804,941 | 9/1957 | Hutchinson | 202/158 |
| 2,847,200 | 8/1958 | Ung | 202/158 |
| 2,965,548 | 12/1960 | Hachmuth | 202/158 |
| 3,062,517 | 11/1962 | Voetter et al. | 261/114.1 |
| 3,151,042 | 9/1964 | Koshoot | 202/158 |
| 3,233,389 | 2/1966 | Dahlen | 202/158 |
| 3,410,540 | 11/1968 | Bruckert | 261/113 |
| 3,417,975 | 12/1968 | Williams et al. | 261/114 JP |
| 4,089,752 | 5/1978 | Hancock | 202/158 |
| 4,159,291 | 6/1979 | Bruckert et al. | 202/158 |
| 4,301,098 | 11/1981 | Mix | 261/114 R |
| 4,496,430 | 1/1985 | Jenkins | 202/158 |
| 4,499,035 | 2/1985 | Kirkpatrick et al. | 202/158 |
| 4,511,537 | 4/1985 | Fiocco et al. | 422/256 |
| 4,547,326 | 10/1985 | Wailer | 261/114 R |
| 4,556,522 | 12/1985 | Wilson | 261/114.1 |
| 4,582,569 | 4/1986 | Jenkins | 202/158 |
| 4,603,022 | 7/1986 | Yoneda | 202/158 |
| 4,615,770 | 10/1986 | Govind | 202/154 |

FOREIGN PATENT DOCUMENTS 0949444 6/1974 Canada .............. 261/114 R

OTHER PUBLICATIONS

Lewis, Jr., "Rectification of Binary Mixtures" M.I.T., Apr. 1936, pp. 399–402.
Fractionation and Towers, Petroleum Refining Engineering, Fourth Ed., pp. 481–485.
"New Fractionating-Tray Designs" by F. J. Lockhart and C. W. Leggett-Advances in Petroleum Refining and Chemistry, vol. I, pp. 276–277; 328–334.

Primary Examiner—Virginia Manoharan
Attorney, Agent, or Firm—Kenyon & Kenyon

[57] ABSTRACT

A vapor-and-liquid contact structure for distillation, fractionation, rectification, absorption, and the refining, in a column, of various liquid materials such as petroleum, chemical, and alcohol solutions wherein provision is made for the inclusion of vertically-spaced bubble plate chambers, having respective liquid and vapor contact devices, to accommodate contact of countercurrent flows of reflux liquid and vapors. A downcomer, including slanted ramps, is disposed outside of the vapor conduit-defining interior, and defines an elongate downcomer structure for liquid flow. Accordingly, descending reflux liquid flow is kept outside of primary vapor flow, with secondary vapor evolving from descending reflux being conducted circuitously back into the primary vapor flow for ascent to the next-above contact device. Plate efficiency is enhanced through maximum plate-area effective use and unidirectional liquid-flow over such plates. Column sections are constructed in essentially identical modules which can be stacked and secured together to reduce fabrication and engineering costs.

17 Claims, 3 Drawing Sheets

VAPOR/LIQUID CONTACT COLUMN STRUCTURE

RELATED APPLICATIONS

This application is a continuation-in-part of application Ser. No. 840,134, filed Mar. 17, 1986, now U.S. Pat. No. 4,750,975. This application is also related to application Ser. No. 054,181, filed May 26, 1987, now U.S. Pat. No. 4,762,651, which is hereby expressly incorporated by reference.

BACKGROUND OF THE INVENTION

The invention relates to columns such as fractional distillation column structures and, more particularly, provides an improved structure for increasing the efficiency of vapor-and-liquid contact column operation.

The patent literature as relates to bubble plates or contact devices, fractionation or rectification columns, and so forth, is quite developed though no such literature is currently known to the inventors which is directly related to the subject invention as claimed. The problem presently confronting the industry is one of increasing efficiency of a column without incurring substantial increases in fabrication and operating costs. A hint of part of what can be done by changes in internal design of columns is given in a paper generated 50 years ago at the Massachusetts Institute of Technology entitled Rectification of Binary Mixtures by W. K. Lewis, Jr., of that institution, publication date at M.I.T. April, 1936. At page 400 of such publication there is illustrated the concept that, for stacked bubble trays or contact devices, efficiency is enhanced where liquid flow is in the same direction over each tray. The publication, however, does not consider how descending reflux liquid can be conducted other than in an enclosed downcomer diagonally through the space directly between the plates; nor does it consider how the substantial vapor content in foam, of the descending reflux liquids, can escape back into the primary vapor path. Such vapor entrained in the reflux, of course, defeats some of the suggested theoretical efficiency of unidirectional reflux liquid flow over the contact trays. Also, the downcomer causes a structural obstruction in the contact chamber, further negating the suggested theoretical efficiency of unidirectional flow.

For ease of discussion of the present invention, the term "contact chamber" shall be used to describe the inner chamber separating the vertically-spaced bubble contact trays. The term "contact tray" or, generically, "contact device", shall be used to identify any one of a variety of trays used in, e.g., distillation towers and columns which can be employed in the present invention, to-wit: sieve trays, valve trays, bubble cap trays, etc. The term "downcomer" shall be used to describe the means of conducting reflux liquid from one tray, or "contact device", to the next lower tray. It shall also be used to describe the space outside the contact chamber and inside the column shell that serves for conducting descending liquid in the present invention. The term "downcomer reservoir" shall be used to describe the reflux pool held back in the downcomer for defoaming prior to entering into the next lower contact chamber prior to side draw cuts being taken.

Certain types of downcomer structures and tray designs have been suggested by a number of authorities to increase liquid flow rates and to tend to minimize loss of efficiency of vapor-and- liquid contact devices. See examples cited in Chapter 16 entitled *Fractionation and Towers,* Petroleum Refining Engineering, Fourth Edition at pages 480–483 and in Chapter 6 entitled *New Fractionating-Tray Designs,* from the work "Advances in Petroleum Refininq and Chemistry", Volume I, at pages 277–334.

No means, since the publication date of these articles, to the knowledge of the inventors, have been devised to carry forward such germ ideas to the extent of the present invention in devolving practical structure. Also, nowhere in any literature, of which the inventors are aware, is there disclosed any means or teaching whatever of accomplishing unidirectional flow across contact devices in a vertical column in a manner such that descending reflux liquid does not interfere with upwardly ascending vapors between contact trays; nor is there indicated in the prior art, of which the inventors are currently aware, of the teaching of using rectangular contact tray areas in vertical columns for maximum use of effective vapor-liquid contact, and also the teaching of fabricating substantially identical column sections of equivalent design, with each fitted with custom-engineered, rectangular contact trays so that the vertical columns herein may be made from modules to fit a needed column or tower, engineeringdesign profile. Furthermore, there is nothing in the teachings in the prior art of the concept of providing elongated ramp-type downcomer structures so as to create essentially quiescent downcomer de-foaming reservoirs prior to almost pure liquid introduction into a next succeeding contact chamber and onto its bubble tray. This increases liquid throughput capacity, aves heat energy, and reduces the need for side-stripper columns and/or processes. In short, the above discussed features and advantages makes the contact column of the present invention more cost-efficient.

SUMMARY OF THE INVENTION

The present invention provides, e.g., a fractionation column, distillery column, absorption column, etc., and sectors thereof, comprising a series of generally uniformly constructed contact modules fitted with contact trays, pre-engineered for the desired vapor capacity, that can be easily assembled one on top of the other into a complete column prior to shipment to use site. Fabricating columns of basically identical modules that contain custom-engineered contact trays, as taught herein, results in manufacturing costs being lower or at least comparable to present column costs. The individual sections are designed such that the path of descending reflux liquid is outside of the ascending primary vapor stream progressing through one contact tray upwardly into the next contact chamber. Furthermore, elongated ramps are provided within the downcomer structure so as to deter froth and/or foam buildup choking the downcomer to the next lower chamber. Also, a structure is provided for permitting ascending secondary vapors evolving from the downcomer reflux reservoirs to rise counter-current relative to the reflux liquid so as to ascent into the contact chamber between vertically adjacent contact trays, and to proceed with the primary vapor stream upwardly through the next upper contact tray. The contact tray and the contact chamber area between contact trays is maintained in an unobstructed condition so as to maximize vaporflow efficiency. Additionally, reflux liquid flows uniformly across the contact trays in the same direction at all levels, thus further enhancing contact tray efficiency. Theoretical studies indicate a 15% to 40% increased efficiency for unidirectional reflux liquid flow. Tests have indicated that the present invention operates in a manner superior to prior designs so far as capacity and operating range are concerned. Column capacity to flood is materially extended. Liquid flow rates over the exit weir of each contact device is greatly improved. Tests have likewise indicated the unique ability of the present still or column to operate at wide ranges of liquid and vapor ratios with low pressure drop.

The present invention may be utilized in petroleum distillation, fractionation, alcohol distillation or rectification, absorption, and indeed, wherever resort is to be had, of in effect separating or combining liquids and semi-liquid materials. It should be noted that by the invention, engineering and capital costs of construction as well as operating costs and heat energy use are significantly reduced over prior art structures.

Accordingly, a principal object of the present invention is to provide a new and improved vapor-and-liquid contact column and components thereof.

A further object is to provide a structure for a more cost-efficient separation of various liquids, semiliquids, and gases into nearly pure fractional compounds and for absorption of gases into liquids.

An additional object is to provide a downcomer structure with an elongated sloping path and reservoir means for reflux liquid to maximize defoaming, defrothing, and degassing or reflux liquid.

An additional object is to provide for a reservoir in the downcomer structure from which vapor-free reflux liquid is introduced onto a next succeeding contact tray.

An additional object is to provide a downcomer reservoir from which essentialy vapor-free liquid can be drawn as product, reducing the need for side cut stripper columns, pumps, etc.

A further object is to provide a structure in columns of the type described which will conduct secondary vapor generated by degassing of liquid in the downcome, back into the primary vapor flow within a contact chamber.

A further object is to provide a structure having a series of vertically-spaced contact chambers which are unimpeded by the downcomer reflux liquid carrying structure.

An additional object is to provide in a column, a series of vertically-spaced contact trays wherein reflux liquid flow thereover is unidirectional.

An additional object is to provide means for installation of custom engineered and designed contact trays for desired vapor flow capacity to achieve optimum pressure drop between successive chambers.

An additional object is to provide a contact column whereby each vertically-spaced contact tray can have a different vapor flow capacity and thereby make possible for heat-removal from the top of the tower and by side-cut products reducing the need for pump-around and pump-back streams lower in the tower.

An additional object is to provide a tower section structure of essentially identical modular units which can be stacked and secured together in a desired tower column.

BRIEF DESCRIPTION OF THE DRAWINGS

The present invention may be understood by reference to the following detailed description, taken in connection with the accompanying drawings in which:

FIGS. 2-6 and 11 are shown in reduced scale.

DETAILED DESCRIPTION

Figure 1:
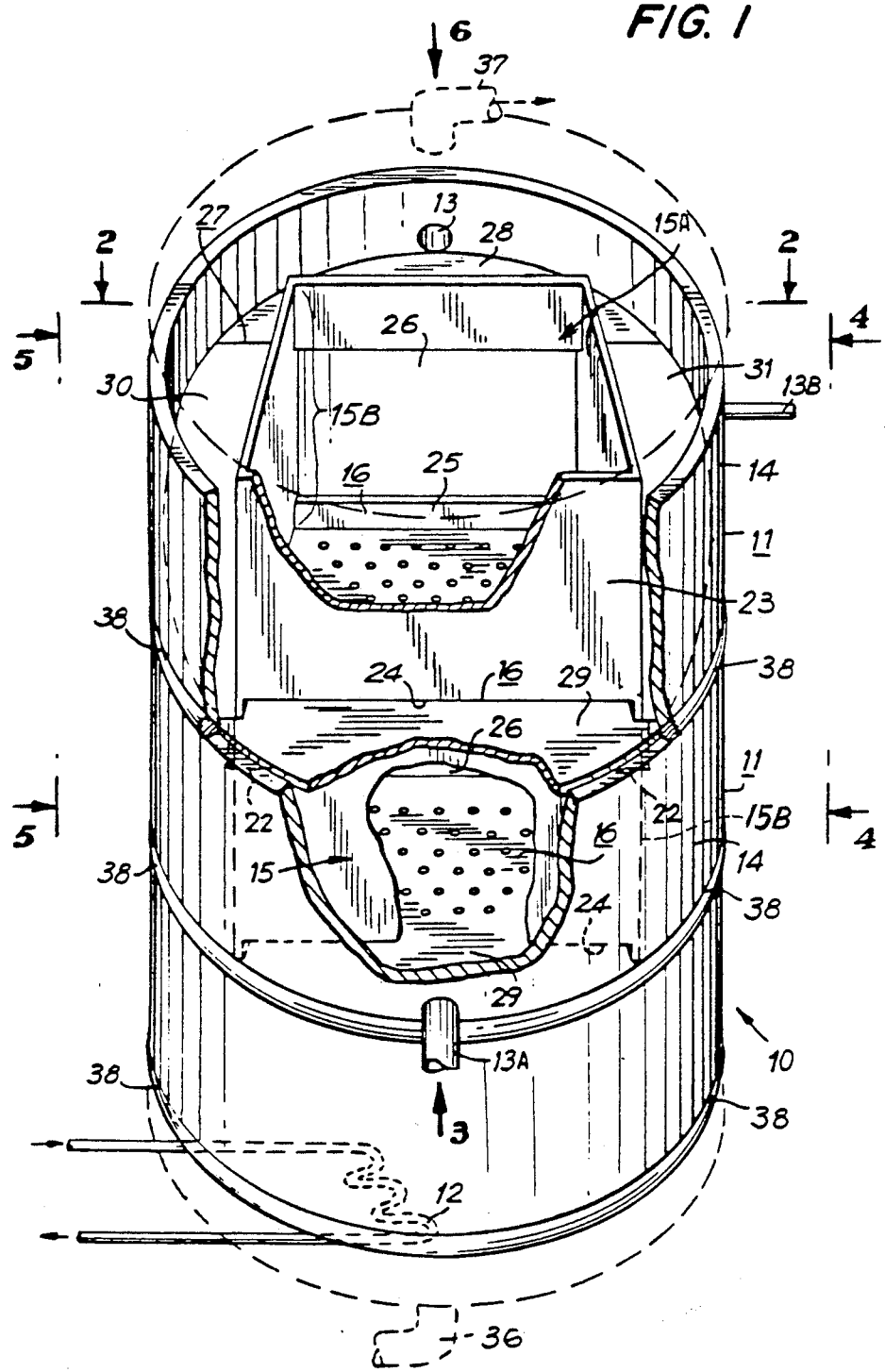
FIG. 1 is a frontal perspective view of a column incorporating the features of the present invention, shown partially broken away, and illustrating two of the several essentially similar sections of the column that can be stacked and secured together.
Figure 2:
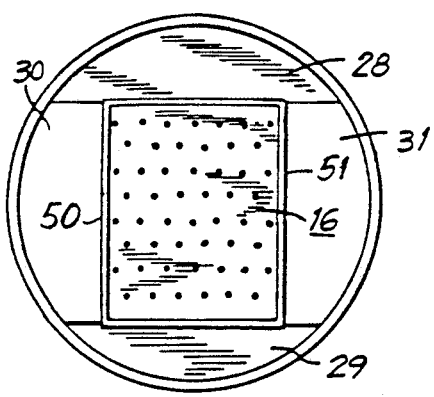
FIG. 2 is a top plan of a representative one of the column sections and is taken along line 2—2 in FIG. 1.
Figure 11:
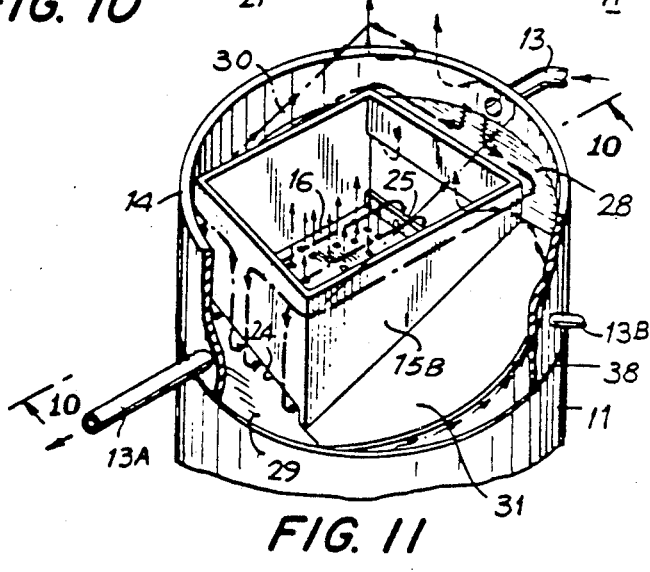
FIG. 11 is a schematic drawing, similar to FIG. 4, but illustrates reflux liquid and vapors flows within a pair of joined sections of the column in FIG. 1.

In FIG. 1, column 10 is shown to comprise a multistage device having a series of sections or modules 11 which may be identical or substantially similar in construction and constructed to fit together in a stacked relationship. Column 10 can include a heat source 12 when that is desired as it would be in some chemical and alcohol distillation processes. Any modular section 11 can be fitted with a feed line inlet 13, a liquid draw line 13A or steam injection line 13B, as illustrated in FIGS. 1 and 11. The individual sections 11 include a shell or wall enclosure structure 14 which provides an outer conduit surrounding a vertical conduit comprising a conduit structure 15A including inner a plurality of vertically stacked chamber stages 15B.

Figure 7:
FIGS. 7, 8, and 9 are details taken along the arcuate line 7—7 in FIG. 6, illustrating a few of various forms of construction that the individual bubble trays or contact devices used may take.
Figure 8:
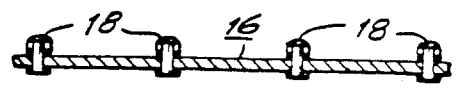
Figure 9:
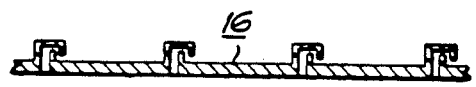

Each of the chamber stages 15B is provided with horizontal liquid-and-vapor "contact tray" 16 which sometimes are also known as bubble trays or contact devices. Contact tray 16 includes an inlet end 50 for fluid ingress and an outlet end 51 for fluid engress. The contact trays provide a means for developing a shallow pool 20, see FIG. 10, of reflux liquid such that a bubbling vapor may pass upwardly through such pool. Contact trays are installed such that they can subsequently be removed and updated for maintenance or custom-engineered changes in vapor flow capacity. Thus, as seen in FIGS. 7-9, the contact device or tray 16 may include perforations (sieve tray) , 17 as seen in FIG. 7; the plates or trays 16 may also include respective bubble caps 18 as in FIG. 8; or the individual contact tray 16.can be the Uniflex tray as in FIG. 9. Such contact devices are sometimes known and sometimes take the form known to those in the industry as sieve trays, bubble cap trays, Flexitrays, float valve trays, and Uniflex trays. The contact tray described in the related application Ser. No. 054,181 has been found to be the most effective for providing high performance in the device of the present invention. Further improved operation of the device of the present invention is achieved when the tray design of the related application is modified to include progressively reduced vapor flow in the downstream direction of the tray. Whichever tray design is selected, it is important that the upwardly ascending vapors within the individual contact chamber sections 21 proceed upwardly through the tray such that a portion of the vapors will condense and enrich the progressively upper reflux pools 20 (FIG. 10), successively, with lighter fractions ascending from lower pools.

Figure 3:
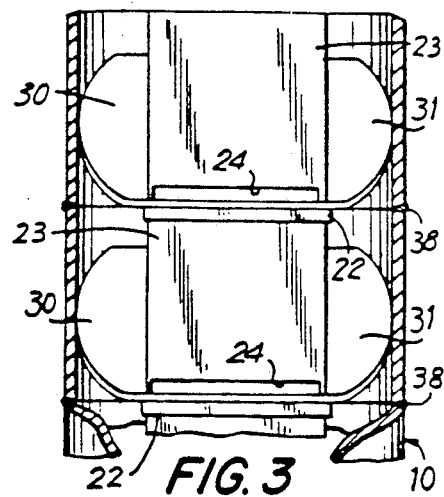
FIG. 3 is a front view of a pair of sections in the structure of FIG. 1, broken away, and is taken along the arrow 3 in FIG. 1.
Figure 5:
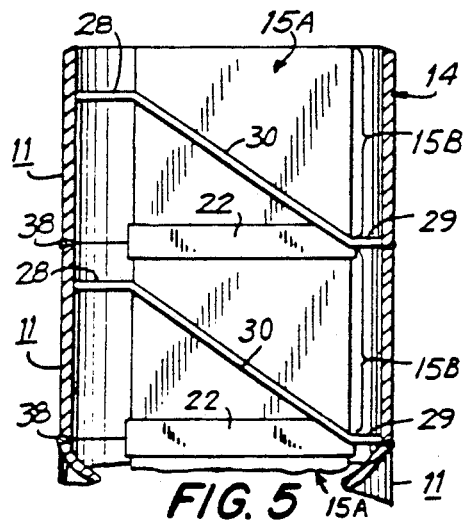
FIG. 5 is a left side elevation, partially broken away, and is taken along the line 5—5 in FIG. 1.

Again, the individual chamber stages 15B may be identical in structure, rectangular in form, and be secured together by suitable straps 22, see FIGS. 1 and 5. It is important to note that a panel 23 of each chamber stage 15B includes a lower gate opening or throat 24, see FIGS. 3 and 10, for the admittance of reflux liquid onto the corresponding contact tray 16. Correspondingly, and at the other end of the contact tray 16 for each stage or section 15B, there will be disposed an exit weir 25 and, thereabove a rear opening 26 in such contact chamber 15B. Successive chambers 15B form the conduit structure 15A for ascending vapors. A downcomer structure 27 is disposed outside the area of the contact chambers 15B, i.e., outside of but affixed to the conduit structure 15A. Each downcomer structure 27 includes an upper portion 28 and a lower horizontal portion 29, interconnected by two, declining ramps 30 and 31. If desired, a single declining ramp 30, 31 need be employed; in such event the remaining side may be simply closed.

In any event, and in the embodiment shown, the downcomer structure receives reflux liquid which gradually descends into reflux reservoir 20A along ramps 30 and 31 to horizontal portion 29. The reflux liquid enters the opening or gate 24 to form a pool 20 over the associated contact tray 16. The pool depth can be defined by the inclusion and setting of the weir 25. Accordingly, and in operation, reflux liquids descend downwardly along the downcomer structure 27 then proceed unidirectionally over the contact trays 16 by virtue of the reflux pools 20 formed relative to weir 25. The reflux liquid overflows the upper edge of weir 25 and through side opening 26; such reflux liquids will descend into the upper position 28 of a next lower downcomer structure 27 via the ramps 30,31.

Figure 10:
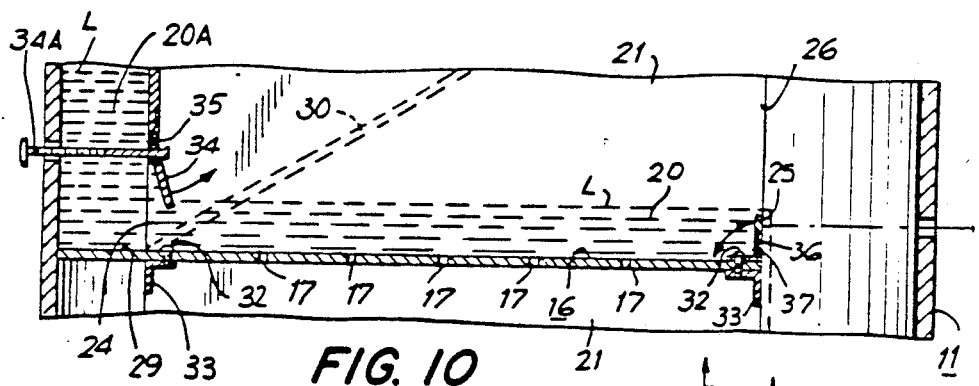
FIG. 10 is an enlarged detail, principally in section, and taken along the line 10—10 in FIG. 11, illustrating adjustable gate and weir contructions.

FIG. 10 illustrates that attachments 32 may be employed to secure the contact devices within their several sections to accommodating brackets 33. These may be included such that the contact trays can be removed when desired, as from the top. Also, FIG. 10 illustrates that opening 24 in FIG. 1, for example, may be formed by an adjustable gate 34, see FIG. 10, that is hinged at 35 to the primary structure and moved by a control 34A. This is for the purpose of selectively increasing the depth of the downcomer reflux liquid, as at reservoir 20A, and thus increase the pressure of such liquid, whereby to introduce liquid uniformly into the contact chambers; reflux liquid depth in the downcomer reservoir will allow for gradation or zoning of the liquid, i.e., from some dense low-level liquid which is essentially gas-free to upper low density liquid levels where gas bubbles are substantially prevalent and susceptible to decay.

FIG. 11 is in schematic form and illustrates the flow of the reflux liquid, the vapors within chamber sections 15B, and also the vapors that ascend from the liquid in the reflux reservoir 20A of the downcomer structure 27. In the latter case, the downcomer structure provides a gradual settling in of descending reflux liquid into the reflux reservoir proximate opening 24. This in essence forms a generally quiescent zone prior to reaching the mouth of 24 above horizontal portion 29. It is essential that the still or column be operated such that the reflux reservoir 20A level is above the lip defining the top of opening 24, thereby forming a liquid seal and keeping any foam or froth above such reflux liquid. The collapsing of bubbles will produce vapors that will be free to go countercurrent to the reflux liquid, prior to the gradually descending reflux liquid, entering opening 24 and the vapor ascending back into one of the contact chambers 15B, then through the associated contact tray 16 into the contact chamber 15B thereabove. A feed line 13, draw-line 13A, steam injection line 13B are also included. Steam-injection may be employed at 13B to lower vapor pressure, at selected still levels, to enchance vaporization.

To be noted is the fact that optimum plate area is employed for vapor-and-liquid contact to maintain constant liquid flow velocity, and to reduce transverse hydraulic gradient across the tray 16; also, inter-plate space is unobstructed and unidirectional flow across the several plates is achieved. FIG. 11 illustrates in detail the reflux liquid and countercurrent vapor flow.

Heat can be supplied if needed by a heat source 12, as illustrated in FIG. 1. Bottoms are drawn off and separately processed as indicated at 36. Non-condensed gas and vapors are drawn off at 37 and fed to condensing units and a portion of which is fed back to the column at the top plate thereof as reflux liquid. The column may be made of any number of modules 11 as shown; each module is engineered for the sections to be easily fitted together and seam-welded or otherwise connected at 38. The regulation of pressure between individual contact modules may be had by custom-engineered contact trays for optimum pressure drop and contact efficiency.

The individual sections are constructed such that the upper portion 28 of a respective downcomer structure 27 is positioned below the horizontal level of contact plate 16 from which the reflux liquid is descending, this so that there will be a desired dropping of reflux liquid as the same overflows the weir and descends in the downcomer structure 27. The elongation and slanted nature of the downcomer ramps 30,31 of each section serves to minimize gas entrainment, frothing and foaming, relative to the relatively gas-free reflux liquid that descends and gathers at the next lower contact chamber at opening 24. This greatly improves the operating efficiency of each contact device. It is noted that reflux flow and defrothing is kept totally outside of the area of the contact chamber of each module appertaining thereto. Further, contact chamber area is unimpeded by a structure carrying reflux liquid to a next lower chamber. In the invention shown, the reflux liquid path as to its descent through the column is maintained outside of conduit structure 15A. Thus, efficiency is further enhanced as to each section and the combined column.

Figure 4:
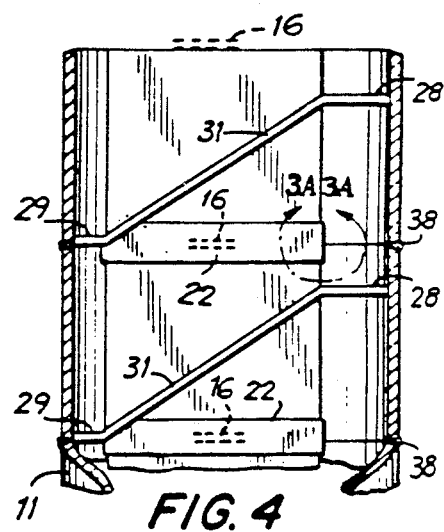
FIG. 4 is a right side elevation, partially broken away, and is taken along the line 4—4 in FIG. 1.

Finally, it is seen that the downcomer structure 27 is arranged such that over-plate liquid proceeds across each contact device in the same direction, i.e., from left to right as per FIG. 4. This further increases efficiency of the column as explained hereinbefore.

What is provided therefore is a new and useful construction for separation or combining (absorption) of vapors, liquids, fractions, etc., through the employment of contact devices for maximum contact of descending reflux liquid and ascending vapors. Provision is made for minimizing inefficiencies, and for omitting downcomer structure directly above and beneath the contact devices, so as to maximize efficiency of use of such contact devices. Likewise, provision is made for upward ascent of secondary vapors and gases escaping from the reflux liquid outside of the contact chamber, so that such may be reintroduced, beneath the next upper contact device.

Figure 6:
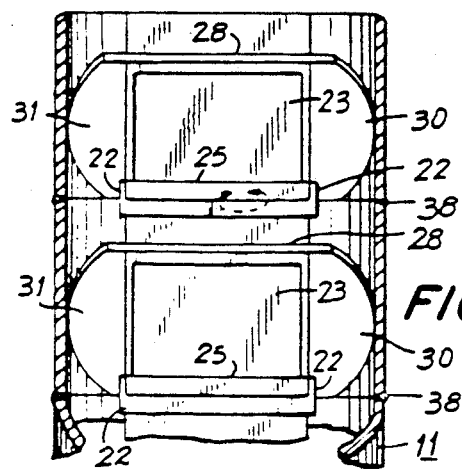
FIG. 6 is a rear view of the pair of sections illustrated in the column of FIG. 1 and is taken along the arrow 6 in FIG. 1.
Figure 3A:
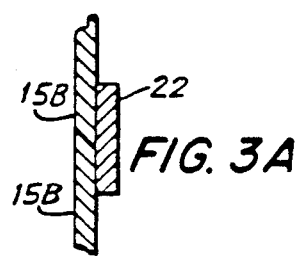

Accordingly, the present invention provides a vertical conduit comprising a conduit structure 15A including a plurality of vertically stacked conduit chamber stages 15B. In a preferred embodiment, each of the conduit chamber stages 15B is of a transverse rectangular cross-section and mounts a rectangular vapor-and-liquid contact tray or device 16, see FIGS. 1 and 11. The conduit structure 15A is arranged to be in correspondence with the contact devices for constraining and conducting vapors emanating from each contact device 16 upwardly. In the structure, the reflux-liquid, slanted downcomer ramps 30, 31 are secured to and spiral, and thus are found spiralling about the conduit structure 15A. The reflux-liquid flow is unidirectional over all of the vapor-and-liquid contact devices 16 due to the configuration of the downcomer structure 27. Indeed, pursuant to the invention, the reflux-liquid path defined by the arrangement and configuration of the wall structure 14, conduit structure 15A, contact devices 16 and the downcomer structure 27 spirals 360° between adjacent, vertically aligned openings 24 of the contact devices 16, as seen in FIGS. 1, 6 and 11. The downcomer ramps 30, 31, with the wall enclosure 14, thus effectively form a countercurrent reflux liquid and gases', 360° progressively redirected flow path about the conduit structure 15A, i.e., a 360° spiralled path, spiralling from one contact device 16 to the contact device 16 next below.

While particular embodiments of the present invention have been shown and described, it will be apparent to those skilled in the art that changes and modifications may be made without departing from the invention in its broader aspects, and, therefore, reference should be made to the appended claims, in determining the true spirit and scope of the invention.

What is claimed is:

1. A column section arranged in a vertical stack of other column sections, said section comprising:
   a vertical conduit having upper and lower ends;
   a vapor and liquid horizontal contract device secured to and extending transversely across said conduit;
   an inlet means and an exit means disposed in said contact device disposed in opposite to one another;
   a reflux liquid admittance throat means in said conduit and connected with said inlet means and a gas admittance and liquid discharge means proximate said contact device exit means;
   a weir disposed at said exit means of said contact device beneath said gas admittance and liquid discharge means;
   a downcomer structure secured to and outside of said conduit and having a lower end connected with said throat means, an upper end disposed above said discharge means, and means for connecting said lower and upper ends of said downcomer structure; and
   a wall enclosure disposed about said conduit and configured to form with said downcomer structure, said conduit and said contact device, a counter current reflux liquid and gas, 360° progressively redirected flow path;
   said upper end of said downcomer structure is arranged to receive a liquid discharge from an exit means of a contact device of one of said other column sections next above said section in said vertical stack for 360° progressively redirected flow of said liquid discharge to the inlet means of said contact device;
   said contact device of said one of said other column sections having an inlet means vertically aligned with the inlet means of said section;
   so that the liquid flow from said inlet means to said exit means of said contact device is unidirectional relative to liquid flow across said contact device of said one of said other column sections next above said section in said vertical stack.

2. The column section of claim 1 and further comprising means adjacent said upper end of said vertical conduit for mechanically connecting said section to a next upper other column section in said vertical stack.

3. The column section of claim 1 wherein said contact device is rectangular in configuration.

4. The column section of claim 3 wherein said vertical conduit is of a transverse rectangular cross section.

5. The column section of claim 1 wherein said means for connecting said lower end and said upper end of said downcomer structure comproses a downwardly sloping ramp.

6. The column section of claim 1 wherein said wall enclosure and said lower end of said downcomer structure define a reflux liquid resevoir at and above said means of the contact device.

7. A vetical column for ascending vapors and countercurrent descending reflux liquid and froth, which comprises:
   plural, mutually-spaced, vertically aligned, horizontal vapor and liquid contact devices, each provided with an outlet means;
   conduit means connected to the outer periphery of and mounting said plural, vertically aligned contact devices for conducting vapor flow from one contact device to and through a next upper contact device;
   a plurality of vertically aligned reflux liquid admittance throat means, each connected with an inlet means of one of said contact devices opposite said outlet means and;
   each inlet means is vertically aligned with the inlet means of a next lower contact device in said vertical column; and
   downcomer means, laterally disposed exterior of and secured to said conduit means, for conducting reflux liquid from the outlet means of each said contact devices to the admittance throat means connected with an inlet means of a next lower contact device to provde a 360° progressively redirected flow path from each admittance throat means to a vertically aligned admittance throat means of said next lower contact device so that the liquid flow across each of said contact devices is unidirectional relative to the liquid flow across the plural devices.

8. The vertical column of claim 7 wherein said downcomer means comprises a spiraling, downwardly sloping downcomer structure.

9. The vertical column of claim 7 wherein said conduit means comprises a plurality of vertically stacked conduit chamber stages.

10. The vertical column of claim 9 wherein each of said conduit chamber stages mounts one of said horizontal vapor and liquid contact devices.

11. The vertical column of claim 7 wherein each of said horizontal vapor and liquid contact devices is rectangular in configuration.

12. A column section for use in a vertical stack of other column sections, said column section comprising:
a vertical conduit having upper and lower ends;
a rectangular, vapor and liquid horizontal contact device secured to and extending transvesely across said conduit;
an inlet means and an exit means disposed opposite to one another in said rectangular contact device
means external to said vertical conduit for conducting reflux liquid to said inlet means from one of said other column section next above said section in said vertical stack; and
means external to said vertical conduit for conducting said reflux liquid from said exit means to one of said other column sections next below said section in said vertical stack.

13. The column section of claim 12 wherein said vertical conduit is of a transverse rectangular cross section.

14. A joined series of superposed, vertically stacked column modules for accommodating countercurrent fluids and vapors, each module including, in combination:
inner and outer, co-axial, mutually-spaced conduits;
a vapor-liquid contact device horizontally disposed and mounted in said inner conduit
fluid ingress means and liquid-and-vapor egress means connected with said contact device at opposite ends thereof, for respectively providing ingress into and egress from said contact device;
downcomer means disposed between and secured to said inner and outer conduits and connected with said ingress means; and
means for securing other upper and lower column modules to said one module at said inner and outer conduit means thereof.

15. The column module of claim 14, wherein said downcomer means is further connected with the liquid-and-vapor egress means of a contact device of a next above column module of the superposed, vertically stacked column modules.

16. A vertical column for ascending vapors and countercurrent descending reflux liquid and froth, which comprises:
plural, mutually-spaced, vertically aligned, horizontal vapor and liquid contact devices, each provided with an outlet means;
conduit means connected to the outer periphery of and mounting said plural, vertically aligned contact devices for conducting vapor flow from one contact device to and through a next upper contact device;
a plurality of reflux liquid admittance throat means each connected with an inlet means of one said contact devices opposite said outlet means; and
downcomer means, laterally dispose exterior of and secured to said conduit means, for conducting reflux liquid from the outlet means of each of said contact devices to the admittance throat means connected with an inlet means of a next lower contact device.

17. The vertical column of claim 16, and further comprising an outer wall enclosure connected to and enclosing the downcomer means, said outer wall enclosure being co-axial with said conduit means.

* * * * *